R. J. SHANNON.
VEHICLE FOR EMERGENCY PLUMBING OPERATIONS.
APPLICATION FILED APR. 14, 1919.
1,317,044.
Patented Sept. 23, 1919.
2 SHEETS—SHEET 1.
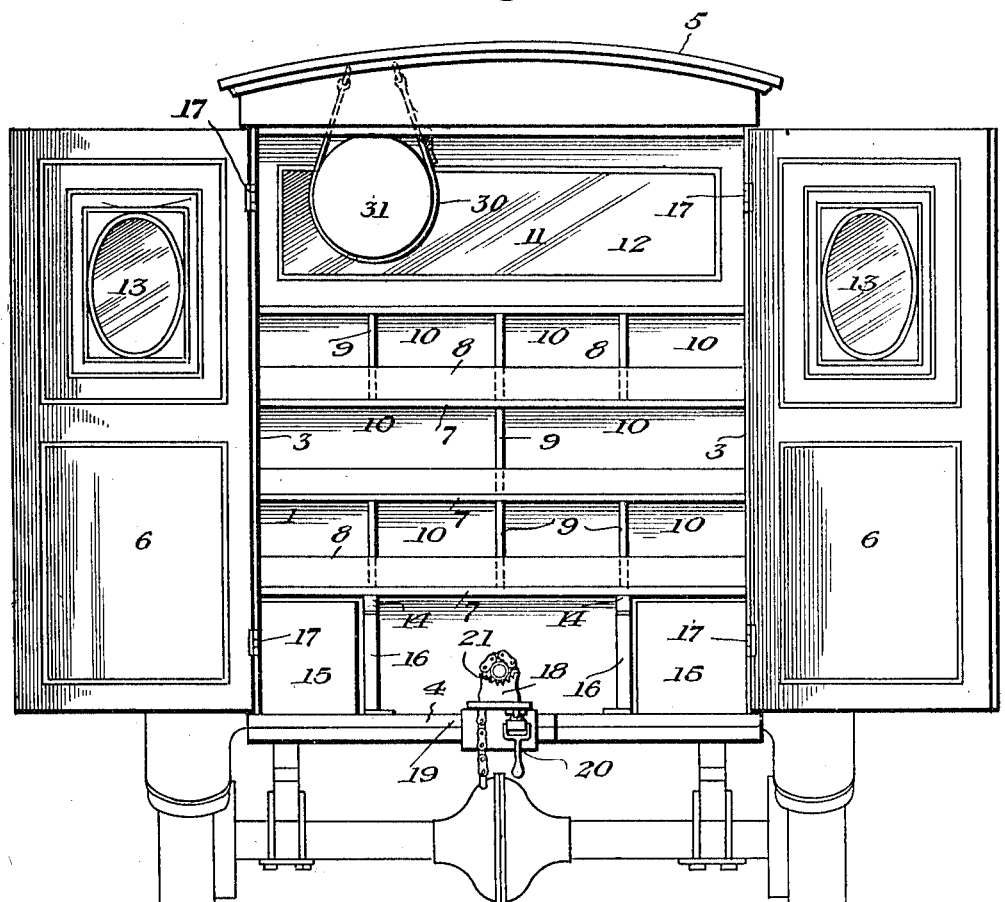
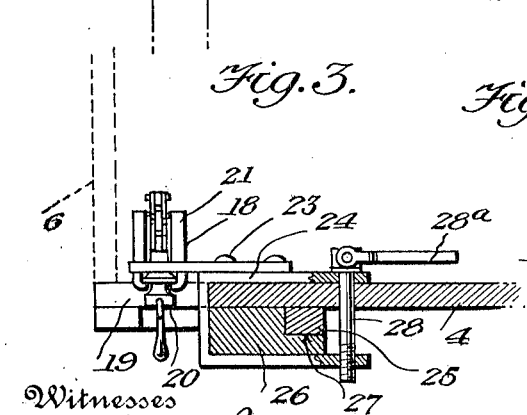
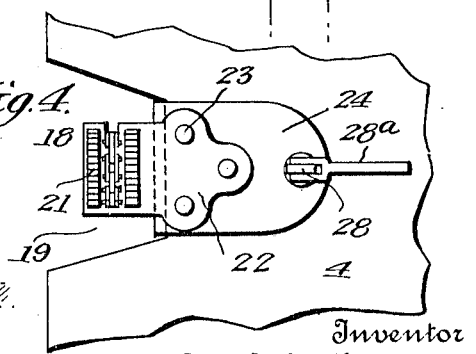
Inventor
Robert J. Shannon
Witnesses
By Victor J. Evans
Attorney

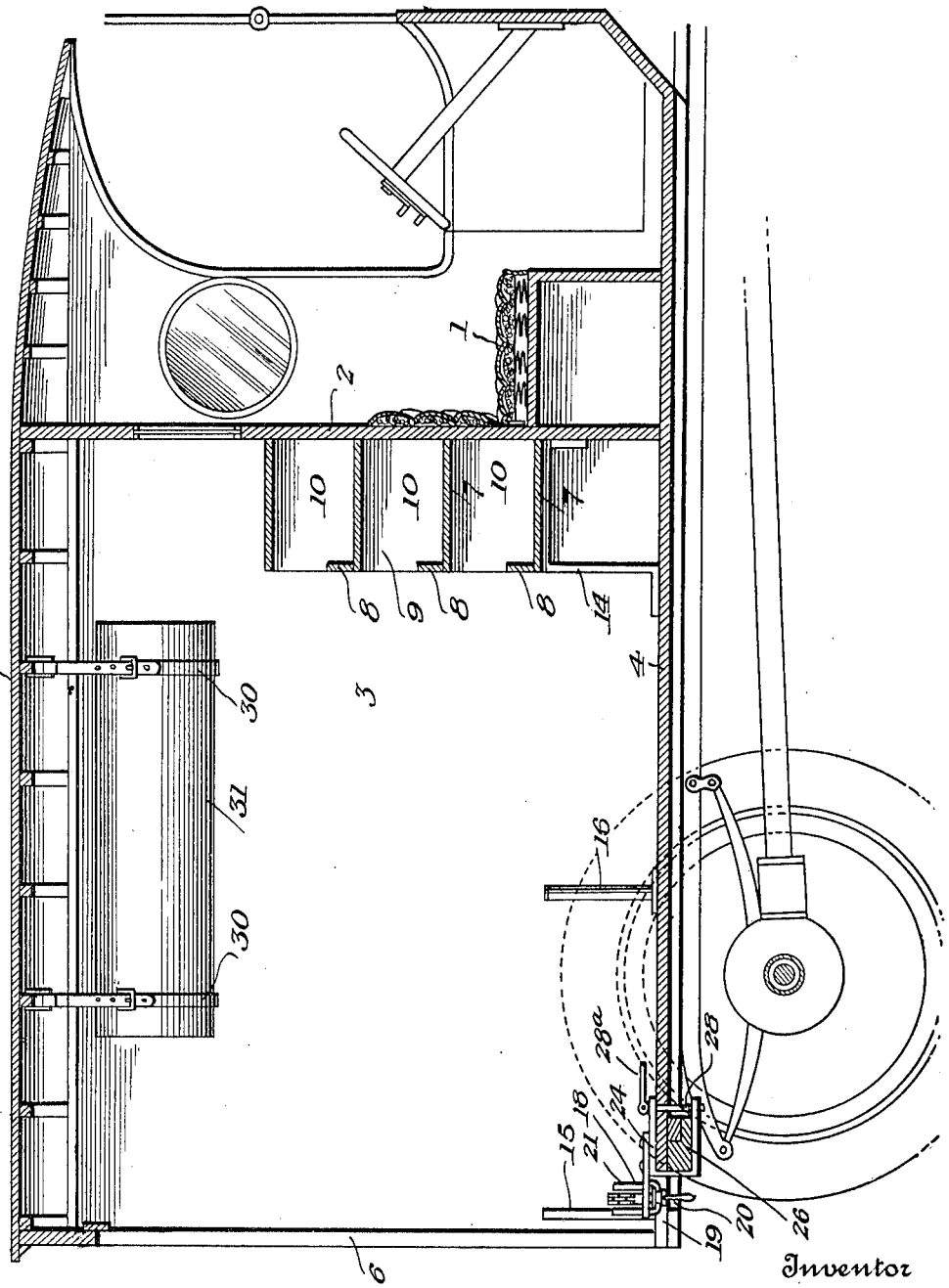

UNITED STATES PATENT OFFICE.

ROBERT J. SHANNON, OF TORONTO, ONTARIO, CANADA.

VEHICLE FOR EMERGENCY-PLUMBING OPERATIONS.

1,317,044.        Specification of Letters Patent.        Patented Sept. 23, 1919.

Application filed April 14, 1919. Serial No. 289,861.

*To all whom it may concern:*

Be it known that I, ROBERT J. SHANNON, a subject of the King of England, residing at Toronto, in the Province of Ontario and Dominion of Canada, have invented new and useful Improvements in Vehicles for Emergency-Plumbing Operations, of which the following is a specification.

The general object of my present invention is the provision of a vehicle body constructed and arranged with a view to carrying in compact manner all of the supplies necessary to plumbing operations, in such manner that each supply is readily accessible, and therefore available for emergency use. The scheme of the invention contemplates the provision of a vehicle generally characterized as stated, and the use of such vehicle when a call is received for a plumbing job that requires immediate attention. Manifestly when a vehicle is equipped with all plumbing accessories as well as tools and appliances necessary to plumbing operations, all that is necessary to be done when an emergency call is received, is to transport the vehicle to the location of the job, when the work may be quickly accomplished under favorable conditions, and in that way the cost of the work is reduced to a minimum. This will be better appreciated when it is stated that under the ordinary conditions extant, a plumber is frequently called to a job and finds when he arrives upon the scene that he lacks either the proper supply or the requisite tools or appliances, and in consequence it is necessary for him to lose the time incidental to returning to his shop and getting back to the job, for all of which the owner is called upon to pay.

Another object of this invention is the provision of a vehicle body of the character stated in which peculiar and advantageous provision is made for the carrying of a considerable number of pipe lengths, and this in such manner that any one of the lengths is readily accessible and yet there is no liability of any one of the lengths being displaced and allowed to thrash about in the body, or lost from the body.

Another and highly important object of the invention is the provision in the vehicle body of a vise or analogous appliance so arranged relative to the body that the appliance is susceptible of being worked to advantage by a mechanic standing upon the ground at the back of the body, and yet the appliance does not interfere in any measure with the complete closing of the doors of the body, which doors are essential features of the body because of the necessity of precluding loss or theft of the many expensive accessories that are necessarily carried in the body.

Another object is the provision of a construction whereby the vise or analogous appurtenance is strongly connected with the bottom of the body in such manner as to afford a solid and adequate bed for the appliance.

Other objects and advantageous characteristics of the invention will be fully understood from the following description and claims, when the same are read in connection with the drawings, hereby made a part hereof, in which:

Figure 1 is a rear view of the vehicle body constituting the best practical embodiment of my invention that I have as yet devised, as the same appears with the rear doors open.

Fig. 2 is a longitudinal vertical section of the same.

Fig. 3 is a detail transverse vertical section of the body.

Fig. 4 is a horizontal section, taken in a plane above the vise or analogous appliance employed, and showing said vise or appliance in plan.

Similar numerals of reference designate corresponding parts in all of the views of the drawings.

My novel vehicle body is designed more particularly, though not necessarily, for use on the chassis of an automobile, and is preferably of the ordinary well known configuration, and is provided at its forward end with an exterior driver's seat 1.

The body comprises a front wall 2, side walls 3, a bottom wall or floor 4, a top wall or roof 5 and back doors 6. At the rear side of the front wall 2 is provided a plurality of shelves 7, arranged in spaced relation and equipped with guard flanges 8. The spaces between said shelves are divided by partitions 9 in the compartments 10 for small accessories, and manifestly while any one of the accessories is readily accessible, the guard flanges 8 may be depended upon to prevent the jolting of the body from displacing any accessory from its respective compartment. In the front wall 2 is a sight opening 11, preferably, though not necessarily occupied by a pane of glass 12, and designed to enable the driver to view the interior of the body and also to look rearwardly from the vehicle through the sight opening 11, and also through the glazed openings 13 that are preferably provided in the rear doors 6.

Fixed at their ends to the front wall 2 and the bottom wall 4, and arranged in spaced relation to the side walls 3, are brackets, preferably, angle irons 14. These brackets or angle irons are disposed under the lowermost shelf 7, and are calculated, by virtue of their relative arrangement, to serve the two-fold function of supports for the recess or shelves 7 and confiners for lengths of pipe, which latter, in the practice of my invention, may be and preferably are carried in longitudinal disposition between the wall 2 at the forward end of the body and upright jamb-pieces 15 that extend inwardly from the rear ends of the side walls 3 and upwardly from the bottom wall 4. Carried by the bottom wall 4 and extending upwardly therefrom at intermediate points in the length of the body are standards 16. These standards 16 are disposed in longitudinal alinement with the angle irons 14, and they are adapted to serve in conjunction with the said angle irons 14 in preventing lateral inward movement of the lengths of pipe, and this without interfering with the convenient lateral lifting of any length of pipe desired from the confining means. From this it follows that a length of pipe may be conveniently introduced into the confining means over the standards 16 and dropped into position. The lengthwise interposition of the length of pipe between the front wall 2 and the jamb-pieces 15 will manifestly preclude the endwise displacement of the lengths of pipe.

The rear doors 6 are hinged at 17 to the major portion of the body, and are arranged to close flush with each other in order to present a neat appearance, and at the same time preclude the loss of any accessory or tool from the interior of the body.

A vise 18 or some analogous appliance forms a highly important part of a plumber's equipment for emergency purposes, and by reference to the drawings, it will be observed that I arrange the vise in a peculiar and highly advantageous manner relative to the bottom wall 4 and the rear doors 6; also, that I strongly connect the vise in fixed relation to the bottom wall 4 and so that an adequate bed is afforded for the vise. In furtherance of this part of my invention, I provide in the bottom wall 4 at the rear end thereof, a recess 19, and in the said recess 19 I dispose the pendent portion 20 of the vise 18, this in order that the said pendent portion or any other part of the vise offers no obstruction whatever to the flush closing of the doors 6, and yet the vise is so disposed that it may be conveniently operated to advantage by a person standing upon the ground and at the back of the body. It will also be noted here that when the doors 6 are closed, the vise will be entirely hidden from view, and that when the doors are opened, ready access to the the vise is afforded. Again the disposition of the pendent portion 20 of the vise in the recess 19 is materially advantageous, inasmuch as it renders it feasible to locate the anvil member 21 of the vise adjacent to the floor 4 of the body, and thereby obviates the necessity of the plumber lifting a length of pipe any material distance from said floor. I would have it distinctly understood, however, that I do not claim any novelty in the vise *per se*.

Also in furtherance of my invention the vise body or bed 22 is fixed at 23 to the upper arm of a yoke, preferably a U-shaped bed member 24, which upper arm is superimposed upon the bottom wall 4, as illustrated. The bight of the U-shaped bed member 24 is arranged to abut against the inner wall of the recess 19, and the lower arm of said bed member is arranged below and in spaced relation to the bottom wall 4 as well as to the transverse member or bolster 25 comprised in the chassis of the vehicle. It will also be observed that a filling block 26, rabbeted at 27 to accommodate the bolster 25, is interposed between the under side of the floor 4 and the lower arm of the U-shaped member, so as to brace and strengthen the connection of the member 24 to the floor 4 and bolster 25 and at the same time contribute to the provision of an adequate bed for the anvil or other appliance employed. At a point in advance of the bolster 25, the arms of the member 24 are connected together and to the floor 4 through the medium of a bolt 28. The bolt 28 is preferably, though not necessarily provided at its upper end with a handle 28[a] designed to contribute to the facility with which the bolt may be removed when it is desired to remove the yoke or member 24 and the vise or other appliance, and store the same as a unit in the compartment or interior of the body.

Manifestly as a whole the construction just described assures rigid connection of the vise or other appliance to the floor 4 of the vehicle body, and at the same time provides a solid and adequate bed which is obviously desirable for the manipulation of the device to the best advantage.

In the preferred embodiment of my invention I prefer to equip the roof 5 of the body with one or more slings 30 for the convenient carriage of one or more expansion tanks, indicated by 31, and this in such manner that an expansion tank may be expeditiously and easily removed when occasion demands. It will also be apparent that without affecting my invention, other means may be provided for the hanging of other accessories from the roof of the body, and that other portions of the interior of the body may be utilized as is deemed most expedient in the carrying out of the general scheme of my invention.

Having described my invention, what I claim and desire to secure by Letters-Patent, is:

1. In a vehicle, the combination of a body having a floor in the rear end of which is a recess, and also having a rear door, a chassis or frame member arranged under and against said floor at a point in advance of said recess, a filling block disposed against the under side of the floor and rabbeted to snugly fit said chassis or frame member, a U-shaped bed member straddling and snugly fitting the floor and the filling block and arranged with its bight against the inner wall of said recess, means extending through the floor and connecting the arms of the bed member at a point in advance of the chassis or frame member, and an appliance carried by the bed member and having a portion pendent in said recess.

2. In a vehicle, the combination of a body having a floor and also having a rear door, a chassis or frame member arranged under and against said floor, a filling block, disposed against the under side of the floor and rabbeted to snugly fit said chassis or frame member, a U-shaped bed member straddling and snugly fitting the floor and the filling block, means extending through the floor and connecting the arms of the bed member, and an appliance carried by the bed member and having a pendent portion disposed in rear of said member.

3. In a vehicle, the combination of a body having a floor or platform, a filling block, a yoke straddling the floor or platform and said block, means for securing the yoke to the platform, and an appliance carried by the yoke.

4. In a vehicle, the combination of a body having a floor or platform and also having a compartment, a door or doors for closing said compartment, a filling or spacing block at the under side of the platform adjacent to the door opening, a yoke straddling said platform and block, means for securing said yoke to the platform, and an appliance carried by the yoke and accessible for operation when the door or doors are opened; said yoke and appliance being removable as a unit for storage in the compartment.

5. In a vehicle, the combination of a body having a floor and also having a rear door, a bed member fixedly connected with said floor and relatively arranged to avoid interference with complete closure of the door, and an appliance carried by said bed member and readily accessible for operation by a person standing on the ground at the rear of the body.

6. In a vehicle, the combination of a body having jamb-pieces extending upwardly from its floor or platform and inwardly from the rear portions of its side walls, and also having on its floor or platform adjacent to its front wall upright confiners in parallel and spaced relation to its side walls, and further having on its floor or platform standards in alinement with said rear jamb-pieces and forward confiners.

7. In a vehicle, the combination of a body having jamb-pieces extending upwardly from its floor or platform and inwardly from the rear portions of its side walls, and also having on its floor or platform adjacent to its front wall upright confining brackets in spaced and parallel relation to its side walls and further having on its floor or platform standards in longitudinal alinement with said rear jamb-pieces and confining brackets; said front wall having a sight opening and bearing a plurality of shelves the lowermost one of which is superimposed upon the said confining brackets, and a door connected with the body at the rear thereof and having a sight opening.

In testimony whereof I affix my signature.

ROBERT J. SHANNON.

Copies of this patent may be obtained for five cents each, by addressing the "Commissioner of Patents, Washington, D. C."